United States Patent
Jo

(10) Patent No.: US 10,484,746 B2
(45) Date of Patent: *Nov. 19, 2019

(54) CAPTION REPLACEMENT SERVICE SYSTEM AND METHOD FOR INTERACTIVE SERVICE IN VIDEO ON DEMAND

(71) Applicant: Geun Sik Jo, Incheon (KR)

(72) Inventor: Geun Sik Jo, Incheon (KR)

(73) Assignee: INHA University Research and Business Foundation, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/699,085

(22) Filed: Sep. 8, 2017

(65) Prior Publication Data

US 2017/0374430 A1     Dec. 28, 2017

Related U.S. Application Data

(62) Division of application No. 14/178,597, filed on Feb. 12, 2014, now Pat. No. 9,794,638.

(30) Foreign Application Priority Data

Dec. 27, 2013  (KR) .................. 10-2013-0165580

(51) Int. Cl.
*H04N 21/488* (2011.01)
*H04N 21/462* (2011.01)
(Continued)

(52) U.S. Cl.
CPC ..... *H04N 21/4884* (2013.01); *H04N 21/4725* (2013.01); *H04N 21/812* (2013.01);
(Continued)

(58) Field of Classification Search
CPC .......... H04N 21/4725; H04N 21/4884; H04N 21/812; H04N 21/8126; H04N 21/8545;
(Continued)

(56) References Cited

U.S. PATENT DOCUMENTS

2004/0111668 A1   6/2004  Cragun et al.
2004/0125877 A1   7/2004  Chang et al.
(Continued)

OTHER PUBLICATIONS

Alazar Tilahun, USPTO Office Action, U.S. Appl. No. 14/178,597, dated Jan. 5, 2016, 15 pages.
Alazar Tilahun, USPTO Final Office Action, U.S. Appl. No. 14/178,597, dated Jul. 19, 2016, 14 pages.
Alazar Tilahun, USPTO Office Action, U.S. Appl. No. 14/178,597, dated Dec. 6, 2016, 16 pages.
Alazar Tilahun, USPTO Notice of Allowance and Fee(s) Due, U.S. Appl. No. 14/178,597, dated Jun. 30, 2017, 9 pages.

*Primary Examiner* — Pankaj Kumar
*Assistant Examiner* — Alazar Tilahun
(74) *Attorney, Agent, or Firm* — Madeline F. Schiesser; Keohane & D'Alessandro PLLC

(57) ABSTRACT

Provided is a caption replacement service system and method for servicing an interactive advertisement on a video on demand (VOD). A system for making an annotation may include an annotation creator configured to create annotation information on a moving object included in a video and an annotation player configured to play a preview on the annotation information based on a frame unit or a shot unit of the video. The video and the annotation information may be used to provide an interactive advertisement by replacing a caption system of the video with a meaningful annotation.

9 Claims, 15 Drawing Sheets

(51) Int. Cl.
*H04N 21/858* (2011.01)
*H04N 21/81* (2011.01)
*H04N 21/472* (2011.01)
*H04N 21/4725* (2011.01)
*H04N 21/8545* (2011.01)
*H04N 21/234* (2011.01)
*H04N 5/272* (2006.01)

(52) U.S. Cl.
CPC ..... *H04N 21/8545* (2013.01); *H04N 21/8586* (2013.01); *H04N 5/2723* (2013.01); *H04N 21/23424* (2013.01); *H04N 21/8126* (2013.01); *H04N 21/858* (2013.01)

(58) Field of Classification Search
CPC ............. H04N 21/858; H04N 21/8586; H04N 21/23424; H04N 5/2723
USPC ................................................ 725/32, 40–45
See application file for complete search history.

(56) References Cited

U.S. PATENT DOCUMENTS

| | | | |
|---|---|---|---|
| 2007/0250781 A1* | 10/2007 | Dolph | G06F 16/489 715/745 |
| 2008/0154908 A1* | 6/2008 | Datar | G06F 17/30817 |
| 2009/0055185 A1 | 2/2009 | Nakade et al. | |
| 2009/0092374 A1 | 4/2009 | Kulas | |
| 2009/0094520 A1* | 4/2009 | Kulas | G06F 17/30056 715/723 |
| 2009/0300475 A1* | 12/2009 | Fink | G06F 17/3082 715/230 |
| 2009/0300699 A1 | 12/2009 | Casagrande et al. | |
| 2010/0293190 A1 | 11/2010 | Kaiser et al. | |
| 2015/0189350 A1 | 7/2015 | Jo et al. | |

\* cited by examiner

FIG. 11

```
<owl:Thing rdf:about="#Video_001">
        <hasTitle rdf:datatype="&xsd;literal">interview with Yu-Na KIM</hasTitle>
        <hasCategory rdf:datatype="&xsd;literal">People&Blogs</hasCategory>
        <hasDescription rdf:datatype="&xsd;literal">It's an interview with skater Yu-Na KIM</hasDescription>
        <hasShot rdf:resource="#Shot_014"/>
        ...
</owl:Thing>

<Shot rdf:about="#Shot_014">
        <hasObject rdf:resource="#Object_059"/>
        <hasPlayTime rdf:resource="#PlayTime_414"/>
        <belongTo rdf:resource="#Video_001"/>
        ...
</Shot>

<owl:Thing rdf:about="#PlayTime_414">
        <hasID rdf:datatype="&xsd;literal">1</hasID>
        <hasStartFrame rdf:datatype="&xsd;long">153</hasStartFrame>
        <hasEndFrame rdf:datatype="&xsd;long">452</hasEndFrame>
</owl:Thing>

<owl:Thing rdf:about="Object_059">
        <hasID rdf:datatype="&xsd;string">2</hasID>
        <hasURL
rdf:datatype=">&xsd;string">http://165.246.43.159/es_tube_beta/img266b1801c18429de9f109535b999e6
1f3f.png</hasURL>
        <hasEvent rdf:resource="#Event_037"/>
        <hasMotion rdf:resource="#Motion_051"/>
        <hasPlayTime rdf:resource="#PlayTime_051"/>
        <expressedTo rdf:resource="#Shape_043"/>
        <appearsIn="#Shot_014"/>
</owl:Thing>

<Shape rdf:about=#Shape_043>
        <hasType rdf:datatype="&xsd;literal">Button</hasType>
        <connectedLink rdf:resource="#Event_037"/>
        <movedTo rdf:resource="#Motion_031"/>
</Shape>

<Motion rdf:about="#Motion_051">
        <hasCoefficient rdf:datatype="&xsd;double">0.5692190-1.569222</hasCoefficient>
        ...
        <hasSamplingRate rdf:datatype="&xsd;literal">30</hasSamplingRate>
        <hasTypeOfInterpolation rdf:datatype=&xsd;literal">cubic spline</hasTypeOfInterpolation>
        <transferOf rdf:resource="#shape_043"/>
</Motion>

<owl:Thing rdf:about="#Event_037">
        <hasType rdf:datatype="&xsd;literal">onClick</hasType>
        <hasUrl rdf:datatype="&xsd;literal">http://www.cabal2.co.kr</hasUrl>
</owl:Thing>
```

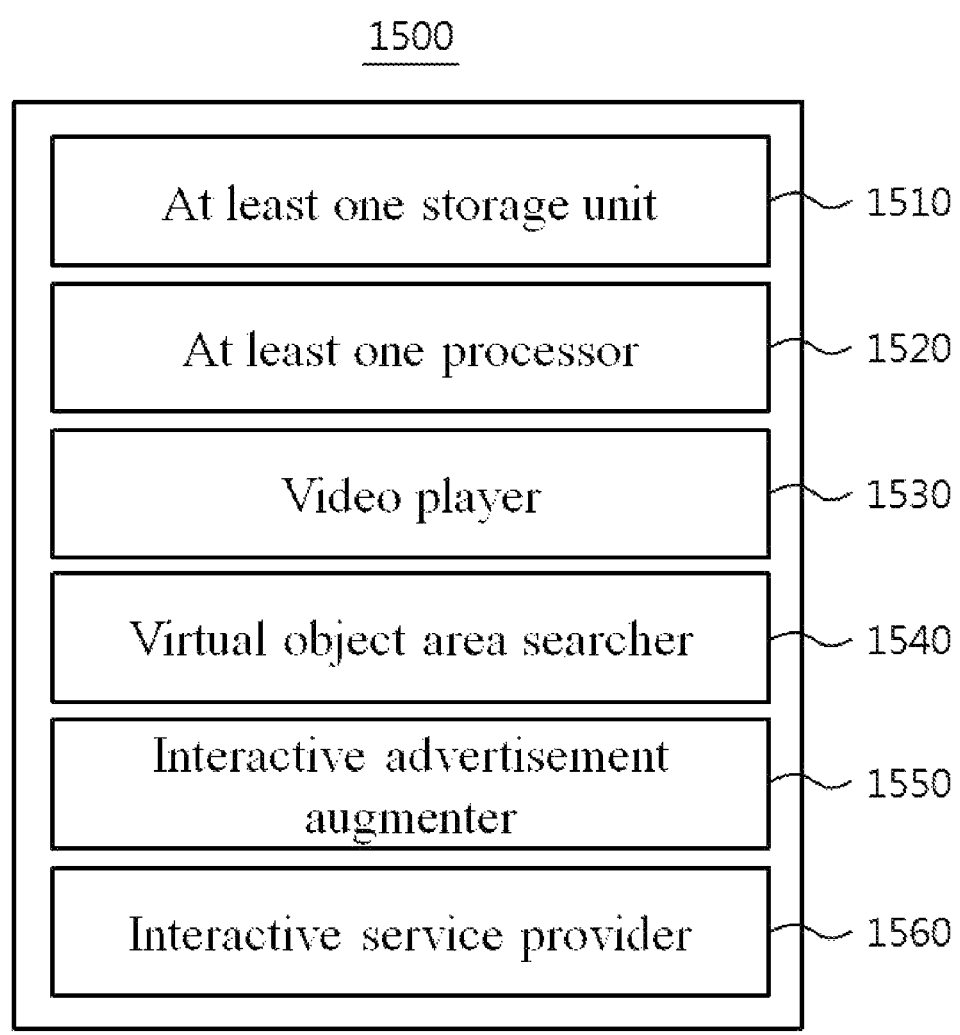

CAPTION REPLACEMENT SERVICE SYSTEM AND METHOD FOR INTERACTIVE SERVICE IN VIDEO ON DEMAND

CROSS-REFERENCE TO RELATED APPLICATIONS

This application claims the priority benefit of Korean Patent Application No. 10-2013-0165580, filed on Dec. 27, 2013, in the Korean Intellectual Property Office, the disclosure of which is incorporated herein by reference. This application is a divisional application of application Ser. No. 14/178,597 filed on Feb. 12, 2014, the disclosure of which is incorporated herein by reference.

BACKGROUND

1. Field of the Invention

Embodiments of the present invention relate to a system and method for replacing content of a closed caption with an interactive advertisement and thereby providing the interactive advertisement in a video on demand (VOD) environment. More particularly, embodiments of the present invention relate to a system and method for replacing closed caption information with an interactive advertisement since contents provided using captions in a runtime broadcasting are meaningful contents in terms of viewing a broadcasting in runtime, such as current issues, a subsequent broadcasting schedule, weather, and stocks, however, closed caption information are no longer meaningful to a user viewing a VOD.

2. Description of the Related Art

In general, when television (TV) users are viewing news or soap operas, runtime data, for example, runtime news information, current weather information, a present time, and information on a broadcasting schedule successive to a current program may be provided to the TV viewers in a caption form to deliver information thereto. However, in an aspect that such a broadcasting is recorded in a video form and provided as a VOD service, runtime information has come to be no more meaningful to a user since a time is elapsed.

More particularly, content of a closed caption may cause a misunderstanding to users viewing a VOD. That is, misunderstanding circumstances may arise. For example, while viewing a VOD, a viewer may check information on stocks of the viewer based on the current stock market appearing in a caption of the VOD. Alternatively, a user may make erroneous judgments based on information on weather and a time appearing in a caption.

To outperform the issues found in the related, an operation of deleting a caption and restoring a video to be in an original form in which the caption is absent may be nearly impossible. Therefore, if it is possible to display viewer-oriented advertisement information at a location of a caption, it is possible to prevent a circumstance that may mislead users and at the same time, to provide new information to the users.

A variety of methods may be used to insert an interactive advertisement into a caption. However, types of captions are various and a caption describing current content is also coexisting. In such a circumstance, it is very difficult to determine a type of caption using an automation method.

SUMMARY

Embodiments of the present invention provide a system that enables a user to easily make an annotation in an intuitive form and a method capable of inserting interactive advertisements at various locations of closed captions.

According to an aspect of the present invention, there is provided a caption replacement service method for annotating an interactive advertisement to a video in a video on demand (VOD) environment, the method including: loading a video to be annotated; adding a virtual object area at a location of at least one caption among captions included in the video; adding an interactive advertisement to the virtual object area; and storing information on the added virtual object area.

The loading of the video to be annotated may include loading the video to be annotated to an annotation tool using a uniform resource locator (URL) of a video present on a web, or selecting a video present in a local computer of a user and loading the selected video to the annotation tool.

The adding of the virtual object area may include adding the virtual object area by, in response to a selection of a user on a temporal location and a spatial location indicated by the at least one caption, locating the virtual object area to be above the at least one caption based on the temporal location and the spatial location.

The adding of the virtual object area may include generating an information list by extracting information on at least one of a frame, a temporal location, and a spatial location associated with a caption present on the video using an image text cognition technology, and adding the virtual object area at the location of the at least one caption based on information selected by a user from the information list.

The interactive advertisement may include at least one of an advertisement image selected by a user and an image extracted from a predetermined advertisement pool.

The image extracted from the advertisement pool may be extracted based on a propensity of the user and a matter of interest of the viewer.

Information on the virtual object area may include information on at least one of a start time and an end time for displaying the virtual object area, a size of the virtual object area, a display location of the virtual object area, content of the interactive advertisement to be added to the virtual object area, a URL address of the interactive advertisement, and an event address generated in response to a click on the virtual object area.

The storing of the information on the added virtual object area may include storing information on the virtual object area in a server in a structuralized form or in an ontology-based semantic form.

According to another aspect of the present invention, there is provided a caption replacement service method for playing an interactive advertisement at a location of a caption in a VOD environment, the method including: playing a video present on a web; searching for information on a virtual object area corresponding to the video from metadata associated with the video; augmenting interactive advertisement information to the virtual object area using the found information on the virtual object area; and providing an interactive service about an event occurring in the virtual object area by a viewer.

According to still another aspect of the present invention, there is provided a caption replacement service system for annotating an interactive advertisement to a video in a VOD environment, the system including: at least one storage unit configured to store at least one program; at least one processor configured to process execution of a video loader, a virtual object area adder, an interactive advertisement adder, and an information storage according to a control of the at least one program; the video loader configured to load a video to be annotated; the virtual object area adder configured to add a virtual object area at a location of at least one caption among captions included in the video; the interactive advertisement adder configured to add an interactive advertisement to the virtual object area; and the information storage configured to store information on the added virtual object area.

According to still another aspect of the present invention, there is provided a caption replacement service system for playing an interactive advertisement at a location of a caption in a VOD environment, the system including: at least one storage unit configured to store at least one program; at least one processor configured to process execution of a video player, a virtual object area searcher, an interactive advertisement augmenter, and an interactive service provider according to a control of the at least one program; the video player configured to play a video present on a web; the virtual object area searcher configured to search for information on a virtual object area corresponding to the video from metadata associated with the video; the interactive advertisement augmenter configured to augment interactive advertisement information to the virtual object area using the found information on the virtual object area; and the virtual service provider configured to provide an interactive service about an event occurring in the virtual object area by a viewer.

According to embodiments of the present invention, there may be provided a method that may prevent a misunderstanding of users viewing a VOD by effectively eliminating content of a closed caption in a VOD environment.

Also, in terms of providing a service that enables a user to easily make an interactive advertisement annotation in an intuitive form, it is possible to provide a customized advertisement service by further effectively eliminating content of a closed caption through an interactive advertisement annotation procedure and an interactive advertisement play procedure.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 11 illustrates an instance of information on a virtual object area stored in an ontology-based semantic form according to an embodiment of the present invention;

FIG. 15 is a block diagram illustrating an internal configuration of a caption replacement service system according to another embodiment of the present invention.

DETAILED DESCRIPTION

Figure 1:
FIG. 1 illustrates an example of various types and locations of captions.

Embodiments of the present invention will now be described in detail to be easily implemented by those skilled in the art by referring to the accompanying drawings. However, the present invention may be embodied in various forms and thus, is not limited to the embodiments disclosed herein. A portion irrelevant to a description is omitted to clearly describe the present invention in the accompanying drawings, wherein like reference numerals refer to like elements throughout.

A technology employed in embodiments of the present invention relates to a system and method that may replace content of a closed caption with an interactive advertisement. Here, the content of the closed caption may have come to be meaningless to users viewing a video on demand (VOD) by payment or free, such as an Internet portal site or an Internet protocol television (IPTV) service that provides a VOD service.

The technology may be generally classified into two types, for example, a vision-based approach method and an annotation-based approach method.

The vision-based approach method refers to a method of finding a location of a closed caption and replacing content of the closed caption with various types of advertisements at the found location of the closed caption by analyzing an image being currently played. FIG. 1 illustrates an example of various types and locations of captions. The aforementioned vision-based approach method may automatically find a location of a caption and thus, is highly advantageous in terms of an automation probability. However, referring to FIG. 1, in the case of the vision-based approach method, types and locations of captions are various and a caption (3) additionally describing content of a current VOD as well as closed captions (1) and (2) coexist and thus, an accuracy of finding a closed caption becomes an issue.

Figure 2:
FIG. 2 illustrates an example of adding an advertisement at a location of a closed caption according to an embodiment of the present invention.

The second method is an interactive advertisement service method using an annotation. FIG. 2 illustrates an example of adding an advertisement at a location of a closed caption. Compared to the vision-based approach method, the annotation may require a relatively large amount of user intervention time and thus, may not be automated. However, as illustrated in FIG. 2, the quality of a resulting product of an interactive advertisement may be very high. Accordingly, embodiments of the present invention propose a method of adding an interactive advertisement at a location of a closed caption using an annotation (see a first advertisement of captions (1) and a second advertisement of (2) of FIG. 2), and a system that enables a user to easily make an annotation.

According to an embodiment of the present invention, in terms of providing a service that enables a user to easily make an interactive advertisement annotation in an intuitive form, a customized advertisement service may be provided through an interactive advertisement annotation procedure and an interactive advertisement play procedure.

Figure 3:
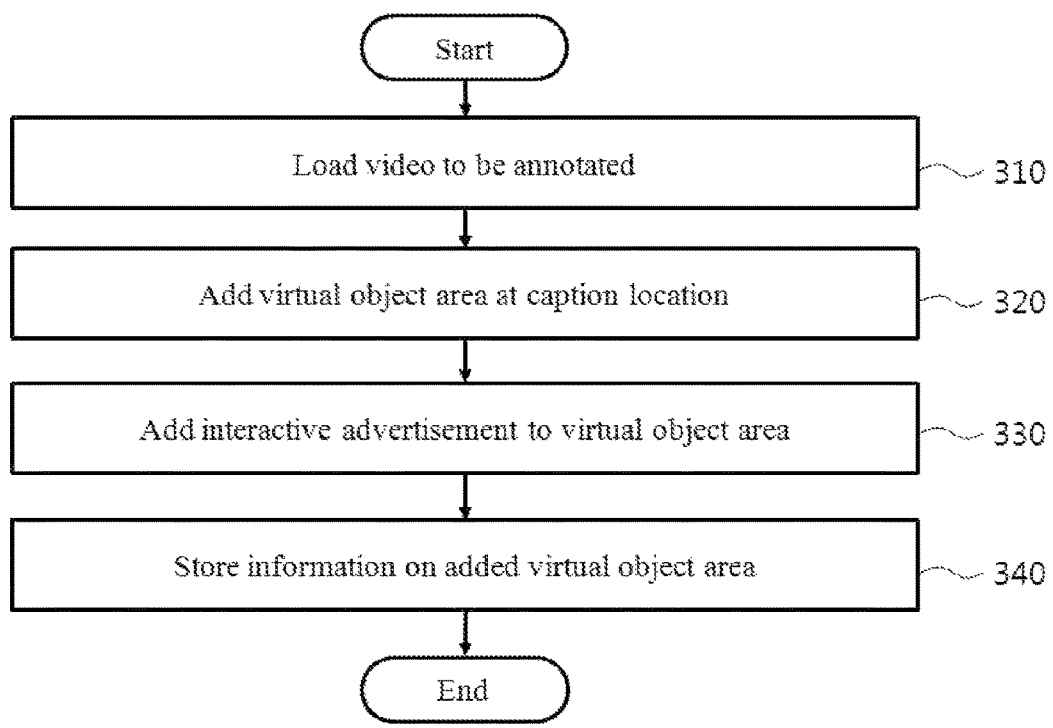
FIG. 3 is a flowchart illustrating a caption replacement service method for making an interactive advertisement annotation at a location of a closed caption according to an embodiment of the present invention.

FIG. 3 is a flowchart illustrating a caption replacement service method for making an interactive advertisement annotation at a location of a closed caption according to an embodiment of the present invention. The caption replacement service method according to the present embodiment may be performed by a caption replacement service system for making an interactive advertisement annotation at a location of a closed caption. The caption replacement service system according to the present embodiment may refer to a system of a user who is to provide an interactive advertisement through a closed caption among captions included in a video. For example, the caption replacement service system according to the present embodiment may be a terminal of a VOD provider.

In operation 310, the caption replacement service system may load a video to be annotated. For example, the caption replacement service system may load the video to be annotated to an annotation tool using a uniform resource locator (URL) of a video present on a web, or may select a video present in a local computer of a user and load the selected video to the annotation tool.

In operation 320, the caption replacement service system may add a virtual object area at a caption location.

According to an embodiment, in response to a selection of a user on a temporal location and a spatial location indicated by at least one caption, the caption replacement service system may add the virtual object area by locating the virtual object area to be above the at least one caption based on the temporal location and the spatial location. For example, a user may select a temporal location and a spatial location that are indicated by a closed caption. Here, the temporal location may be a predetermined frame of a video or a time of the video, and the spatial location may be an X location, a Y location, width, and height information of a caption corresponding to a current time or a current frame. In this case, the caption replacement service system may locate the virtual object area to be above the caption based on the selected temporal location and spatial location selected by the user.

According to another embodiment, the caption replacement service system may generate an information list by extracting information on at least one of a frame, a temporal location, and a spatial location associated with a caption present on the video using an image text cognition technology, and may add the virtual object area at the location of the at least one caption based on information selected by a user from the information list. For example, the caption replacement service system may extract information on temporal locations and/or spatial locations of captions included in a video using the image text cognition technology, and may generate an information list that is a list of information on the captions extracted. In this case, the caption replacement service system may provide the generated information list to a user and the user may easily select a predetermined caption within the video, for example, a caption that is determined to currently have no meaning by the user by selecting information on the predetermined caption from the information list. Here, the caption replacement service system may add a virtual object area to a caption corresponding to the selected information. When information extracted using the image text cognition technology is insufficient to designate a predetermined caption, the caption replacement service system may accurately recognize a location of the caption by further referring to temporal information and/or spatial information input from the user that has been provided with the information list.

In operation 330, the caption replacement service system may add an interactive advertisement to the virtual object area. For example, the user may directly select an advertisement image and the caption replacement service system may add the selected advertisement image to the virtual object area. As another example, the caption replacement service system may add content of an advertisement pool as an interactive advertisement. For example, the caption replacement service system may extract, from the advertisement pool, content that is determined to draw a viewer's attention based on a propensity and a matter of interest of the viewer, and may statically or dynamically add the extracted content.

In operation 340, the caption replacement service system may store information on the added virtual object area. For example, the caption replacement service system may store information on a location at which the virtual object area is to be displayed, in a server in a structuralized form, for example, an extensible markup language (XML) or a JavaScript object notation (JSON) form or in a semantic form, such as ontology, in order to store information on the added virtual object area. Here, information on the added virtual object area may include a start time and an end time for displaying the virtual object area, a size and a display location of the virtual object area, content or a URL address of an advertisement to be added to the virtual object area, an even address generated in response to a click on the virtual object area, and the like.

Figure 4:
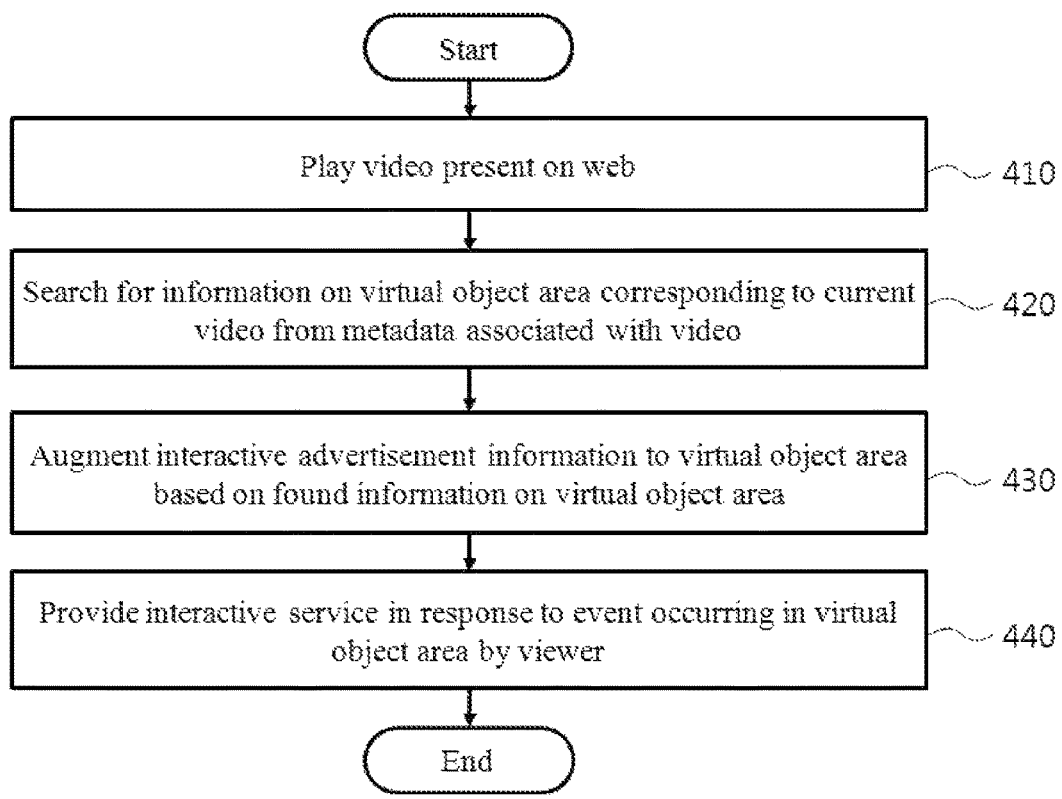
FIG. 4 is a flowchart illustrating a caption replacement service method for playing an interactive advertisement at a location of a closed caption according to an embodiment of the present invention.

FIG. 4 is a flowchart illustrating a caption replacement service method for playing an interactive advertisement at a location of a closed caption according to an embodiment of the present invention. The caption replacement service method according to the present embodiment may be performed by a caption replacement service system for playing an interactive advertisement at a location of a closed caption. The caption replacement service system according to the present embodiment may refer to a system of a user who is to play a video. For example, the caption replacement service system according to the present embodiment may be a terminal of a VOD viewer.

In operation 410, the caption replacement service system may play a video present on a web (e.g., the Internet). For example, the caption replacement service system may play a video selected on a web by a viewer viewing a VOD.

In operation 420, the caption replacement service system may search for information on a virtual object area corresponding to a current video from metadata associated with the video. For example, to search for information on the virtual object area, the caption replacement service system may search for information on the virtual object area corresponding to a video selected by the viewer at a first time when the selected video is played, or at predetermined time intervals, and may determine whether a time at which the selected video is to be played and a start time for displaying the virtual object area match.

In operation 430, the caption replacement service system may augment interactive advertisement information to the virtual object area using the found information on the virtual object area. For example, to augment the virtual object area, the caption replacement service system may dispose and thereby display the interactive advertisement information within the video, based on information on a temporal location and a spatial location of the virtual object area in the information found in operation 420.

In operation 440, the caption replacement service system may provide an interactive service about an event occurring in the virtual object area by the viewer. Here, the event may occur in response to an action of the viewer such as a click or a mouse over. For example, in response to a selection of the viewer on augmented interactive advertisement information displayed at a location of a closed caption of a video being played, the caption replacement service system may further provide the viewer with additional information associated with the interactive advertisement information as an interactive service.

Figure 5:
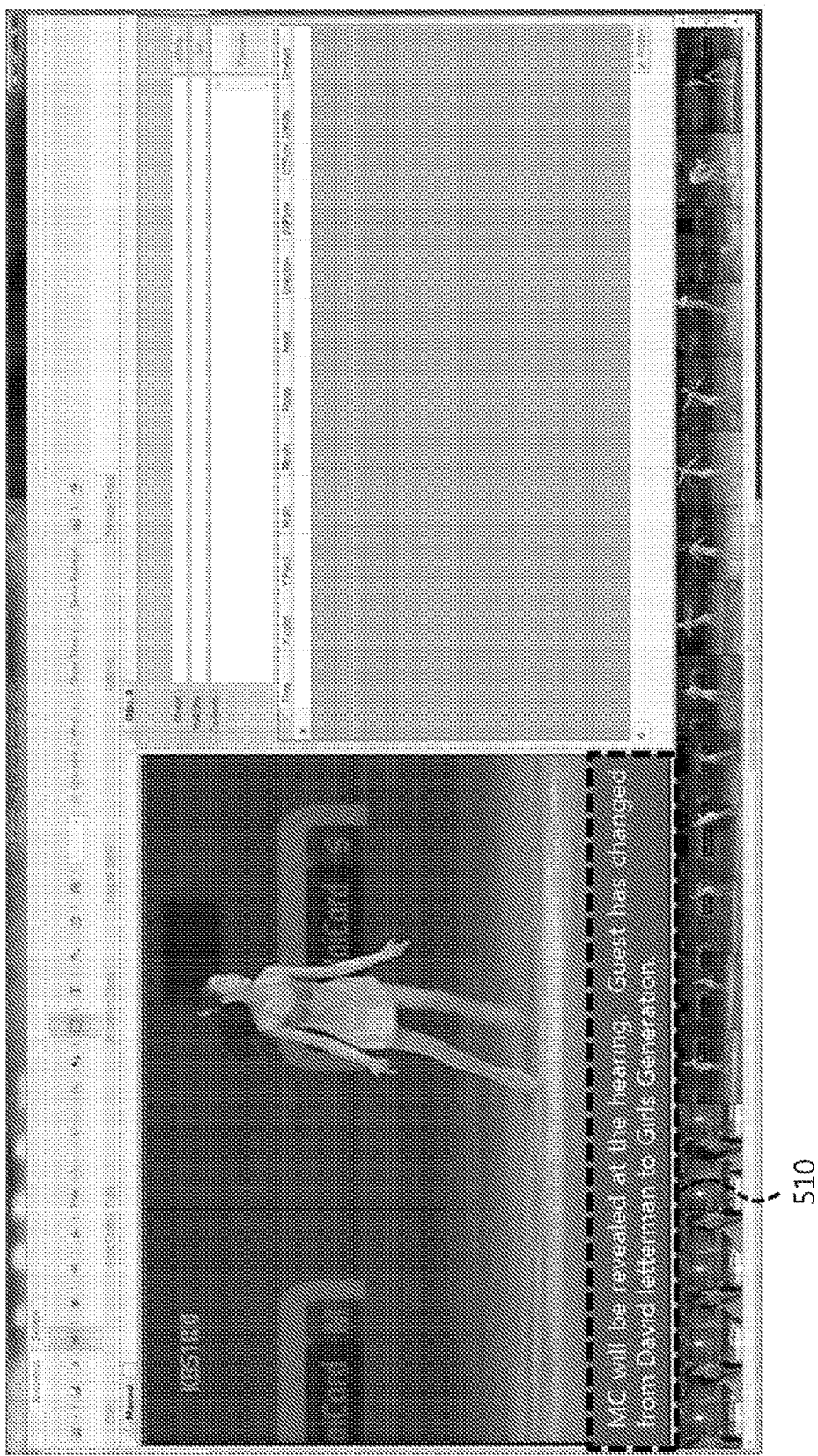
FIG. 5 illustrates an example of a screen on which a video is loaded to an annotation tool in order to make an interactive advertisement annotation according to an embodiment of the present invention.

FIG. 5 illustrates an example of a screen on which a video is loaded to an annotation tool in order to make an interactive advertisement annotation according to an embodiment of the present invention. As described above, a video to be annotated may be loaded by loading the video to be annotated to the annotation tool of FIG. 5 using a URL of a video present on the web or by selecting a VOD present on a local computer of a user and loading the selected video to the annotation tool. Here, a box 510 indicated by a dotted line refers to an example in which a video includes a closed caption.

Figure 6:
FIG. 6 illustrates an example of a screen on which a virtual object area is generated at a caption location according to an embodiment of the present invention.

FIG. 6 illustrates an example of a screen on which a virtual object area is generated at a caption location according to an embodiment of the present invention. As described above, to add the virtual object area at the caption location, in response to a selection of a user on a temporal location and a spatial location at which the closed caption is displayed, the caption replacement service system may locate the virtual object area at a location of the closed caption as illustrated in a box 610 indicated by a dotted line. Here, the temporal location may be a predetermined frame of a video or a time of the video, and the spatial location may be a X coordinate, a Y coordinate, width, and height information of a caption corresponding to a current time or a current frame.

Figure 7:
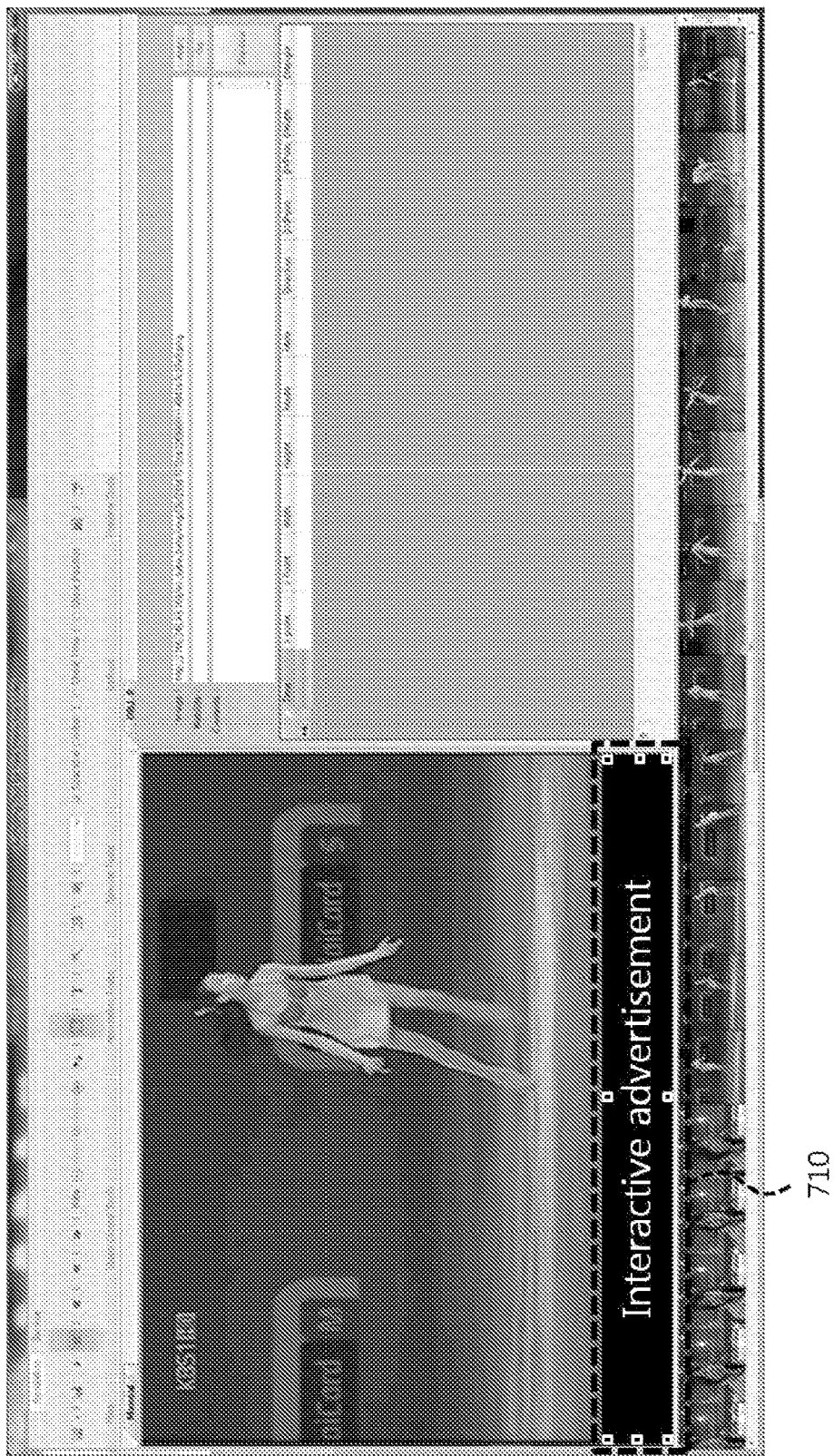
FIG. 7 illustrates an example of a screen on which an interactive advertisement is added to a virtual object area according to an embodiment of the present invention.

FIG. 7 illustrates an example of a screen on which an interactive advertisement is added to a virtual object area according to an embodiment of the present invention. As described above, to add the interactive advertisement, the caption replacement service system may add, to the virtual object area, content of an advertisement image directly selected by a user or content selected by the caption replacement service system from an advertisement pool. For example, the caption replacement service system may select, from the advertisement pool, content that is determined to draw the user's attention based on a propensity and a matter of interest of the user, and may add the selected content to the virtual object area. A box 710 indicated by a dotted line refers to an example in which the interactive advertisement is added to the virtual object area of FIG. 6.

Figure 8:
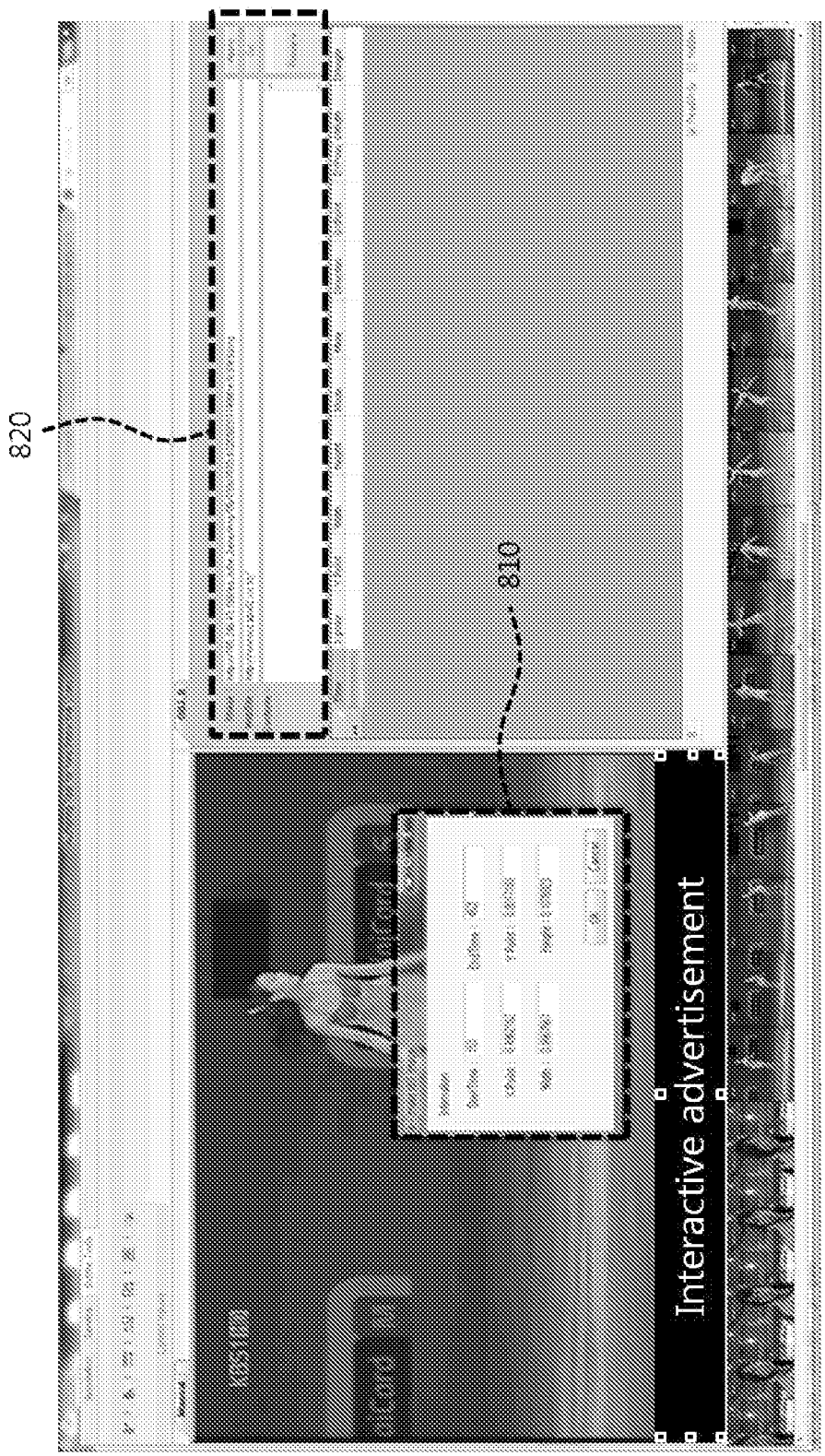
FIG. 8 illustrates an example of information on an added virtual object area according to an embodiment of the present invention.

FIG. 8 illustrates an example of a user interface for inputting information on an added virtual object area according to an embodiment of the present invention. For example, a first box 810 and a second box 820 indicated by dotted lines refer to user interfaces for inputting a start time (StartTime) and an end time (EndTime) for displaying a virtual object area, a size of the virtual object area, for example, a width and a height of the virtual object area and a location of the virtual object area, for example, XPoint and YPoint of the virtual object area, content or a URL address of an advertisement to be added to the virtual object area, and information on an event address generated in response to a click on the virtual object area, as information on the virtual object area through an annotation tool.

Figure 9:
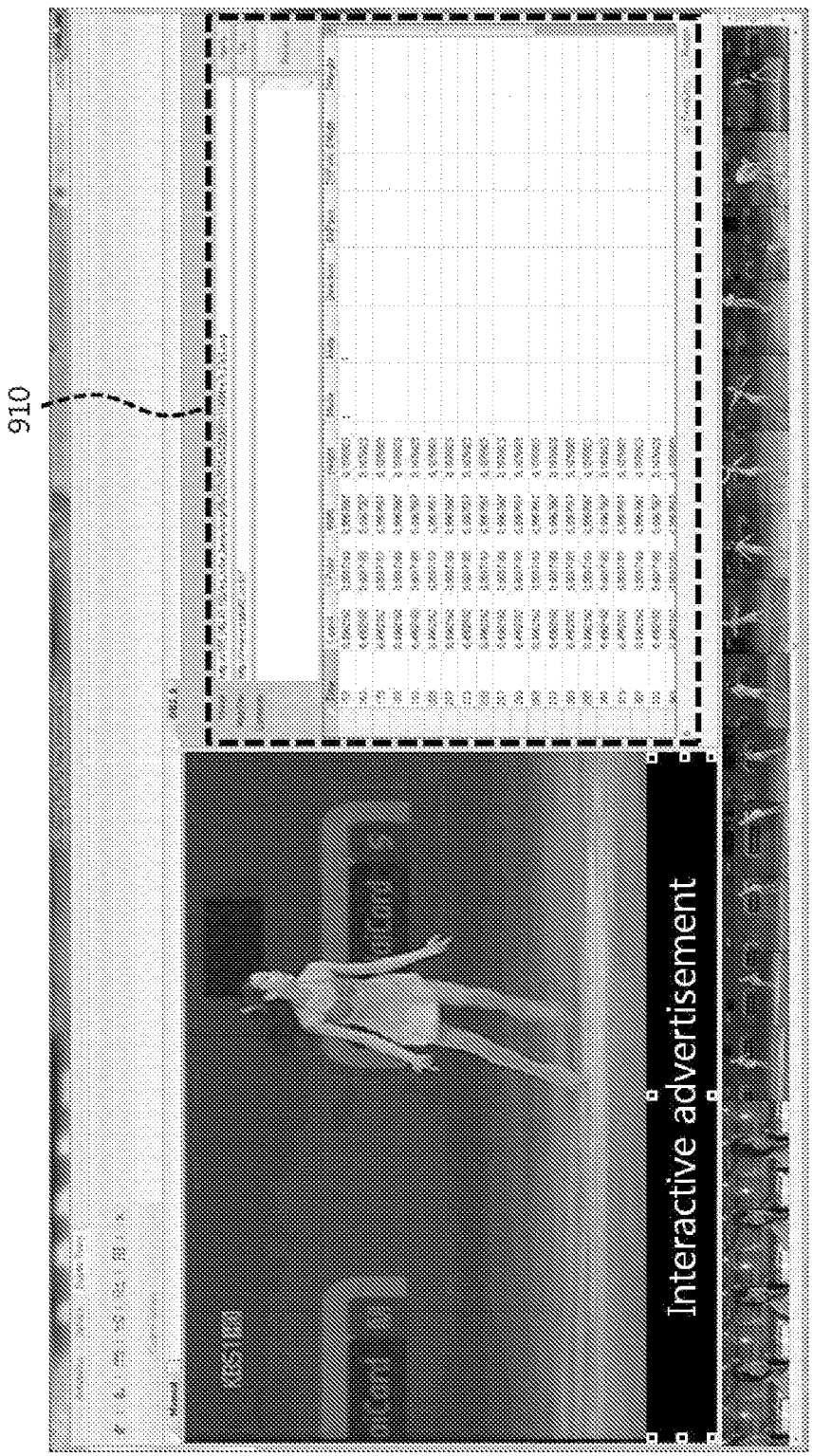
FIG. 9 illustrates an example in which information on an added virtual object area is input according to an embodiment of the present invention.

FIG. 9 illustrates an example in which information on an added virtual object area is input according to an embodiment of the present invention. For example, a box 910 indicated by a dotted line refers to a user interface in which a start time (StartTime) and an end time (EndTime) for displaying a virtual object area, a size of the virtual object area, for example, a width and a height of the virtual object area and a location of the virtual object area, for example, XPoint and YPoint of the virtual object area, content or a URL address of an advertisement to be added to the virtual object area, and information on an event address occurring in response to a click on the virtual object area are input.

Figure 10:
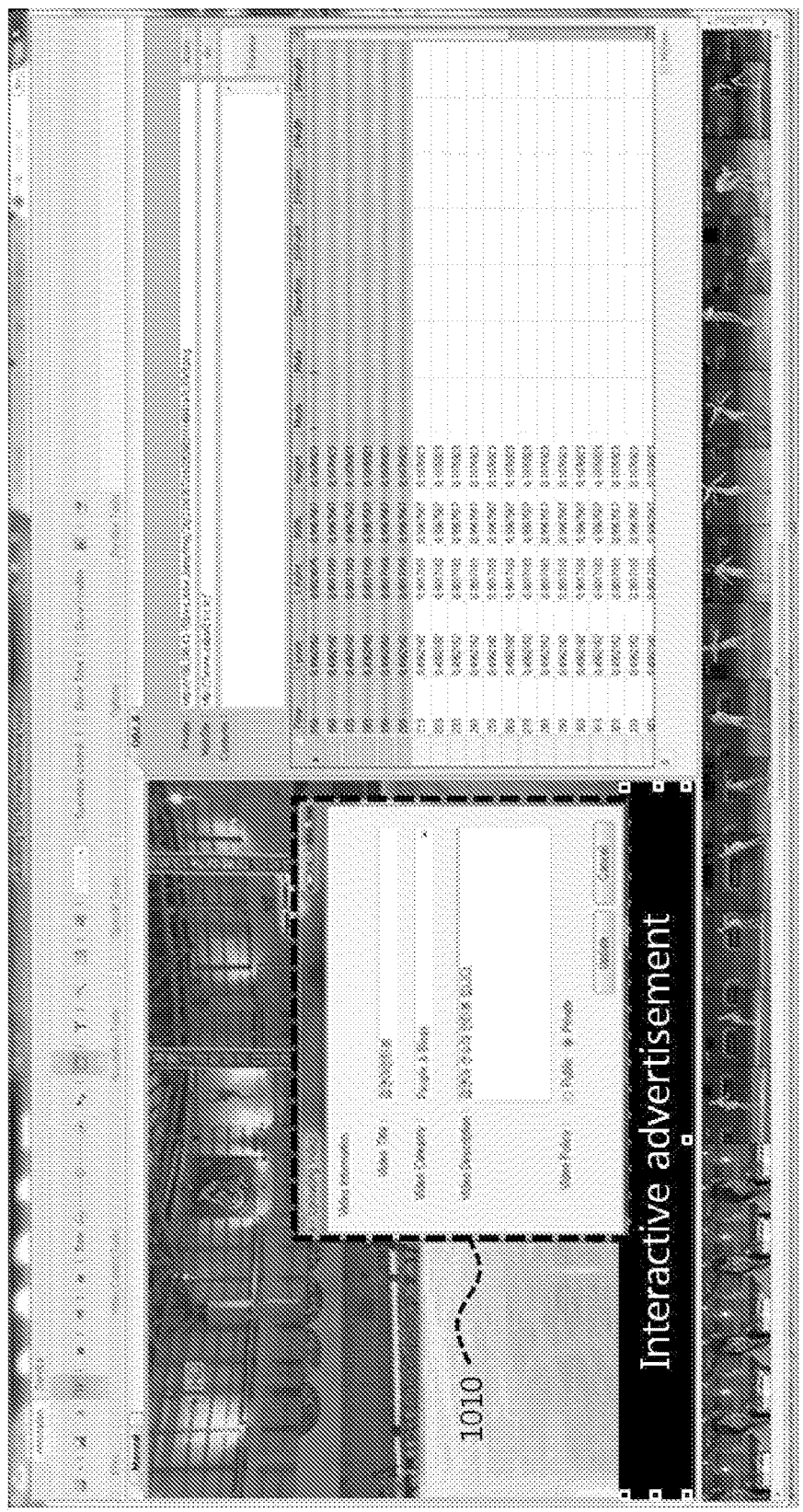
FIG. 10 illustrates an example of storing input information on a virtual object area according to an embodiment of the present invention.

FIG. 10 illustrates an example of storing input information on a virtual object area according to an embodiment of the present invention. A box 1010 indicated by a dotted line refers to an example of storing input information on the virtual object area using an annotation tool. Here, the input information on the virtual object area may also include a video title, a video category, a video description, and where the video is public or private.

FIG. 11 illustrates an instance of information on a virtual object area stored in an ontology-based semantic form according to an embodiment of the present invention.

Figure 12:
FIG. 12 illustrates an example of augmenting an interactive advertisement to a video according to an embodiment of the present invention.

FIG. 12 illustrates an example of augmenting an interactive advertisement to a video according to an embodiment of the present invention. In this example, the video is being played with the interactive advertisement being displayed on a closed caption.

Figure 13:
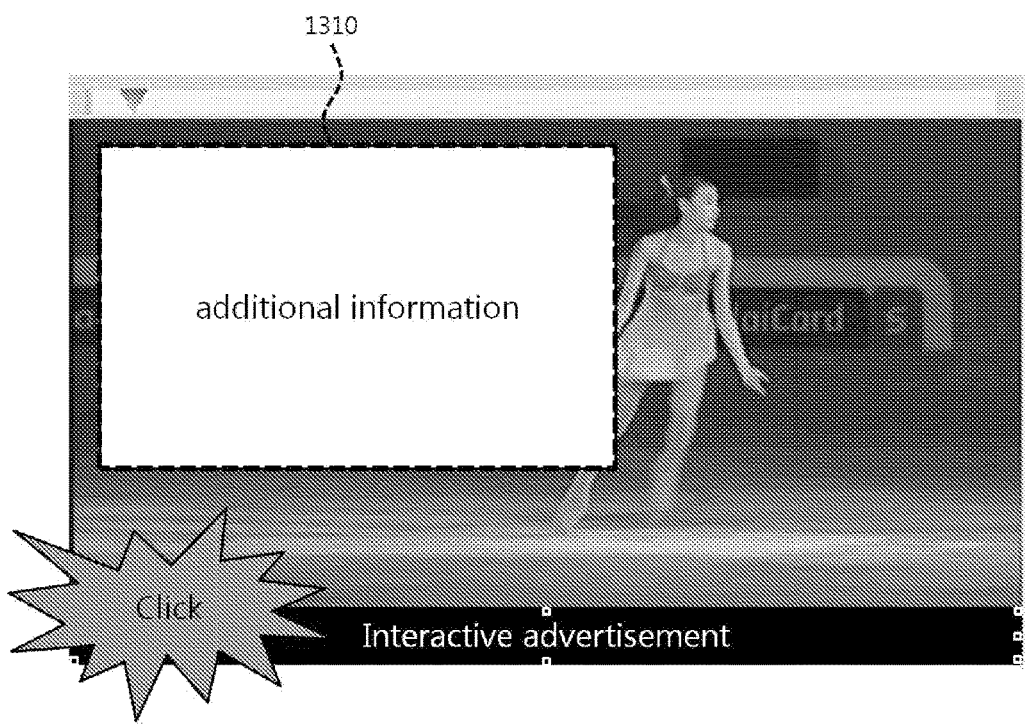
FIG. 13 illustrates an example of providing additional information according to an embodiment of the present invention.

FIG. 13 illustrates an example of providing additional information according to an embodiment of the present invention. A box 1310 indicated by a dotted line refers to an example of displaying additional information in response to a selection, for example, a click of a user on an interactive advertisement.

Figure 14:
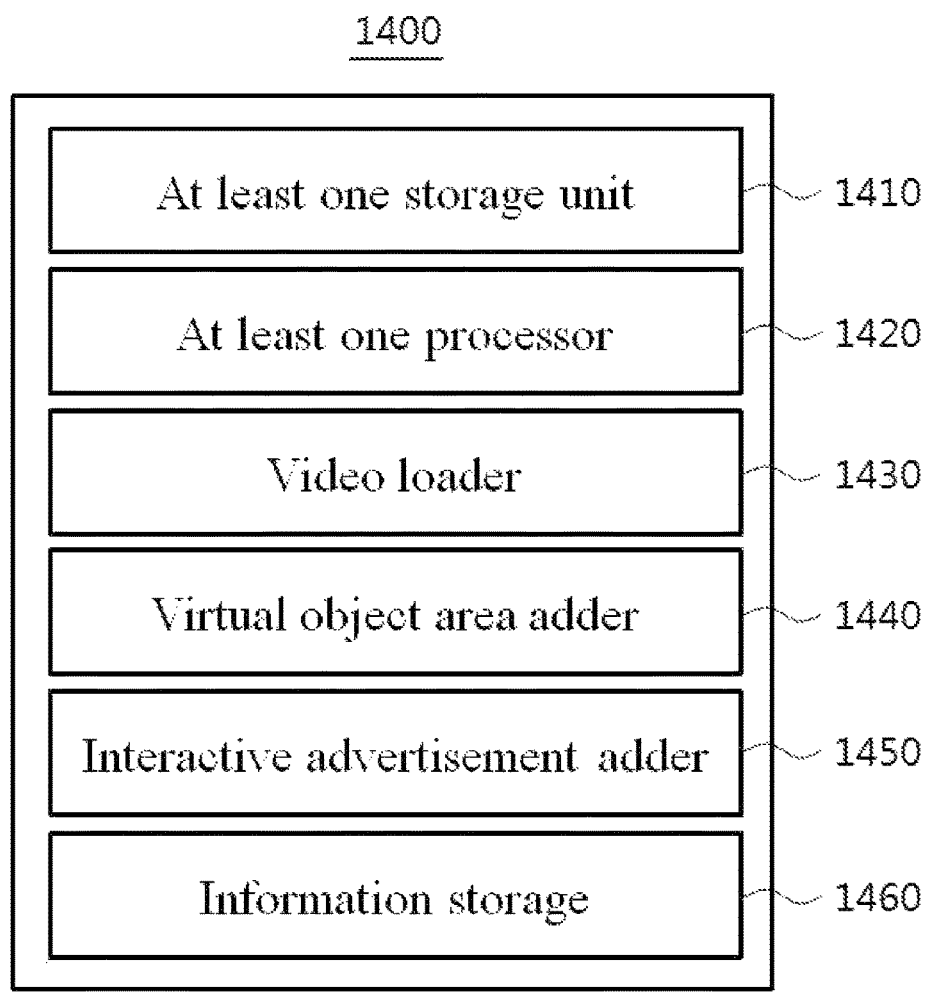
FIG. 14 is a block diagram illustrating an internal configuration of a caption replacement service system according to an embodiment of the present invention.

FIG. 14 is a block diagram illustrating an internal configuration of a caption replacement service system 1400 according to an embodiment of the present invention. The caption replacement service system 1400 of FIG. 14 may refer to a computer system configured to perform a caption replacement service method for making an interactive advertisement annotation, which is described with reference to FIG. 3. To this end, the caption replacement service system 1400 may include at least one storage unit 1410 (i.e., a non-transitory computer readable storage medium) configured to store at least one program and at least one computer processor 1420 configured to control execution of other constituent elements according to a control of the at least one program. Also, the caption replacement service system 1400 may include, as the other constituent elements, a video loader 1430, a virtual object area adder 1440, an interactive advertisement adder 1450, and an information storage 1460.

The video loader 1430 may load a video to be annotated. For example, the video loader 1430 may load the video to be annotated to an annotation tool using a URL of a video present on a web, or may select a video present in a local computer of a user and load the selected video to the annotation tool.

The virtual object area adder 1440 may add a virtual object area at a caption location.

According to an embodiment, in response to a selection of a user on a temporal location and a spatial location indicated by at least one caption, the virtual object area adder 1440 may add the virtual object area by locating the virtual object area to be above at least one caption based on the temporal location and the spatial location. For example, a user may select a temporal location and a spatial location that are indicated by a closed caption. Here, the temporal location may be a predetermined frame of a video or a time of the video, and the spatial location may be a X coordinate, Y coordinate, width, and height information of a caption corresponding to a current time or a current frame. In this case, the virtual object area adder 1440 may locate the virtual object area to be above the caption based on the temporal location and the spatial location selected by the user.

According to another embodiment, the virtual object area adder 1440 may generate an information list by extracting information on at least one of a frame, a temporal location, and a spatial location associated with a caption present on the video using an image text cognition technology, and may add the virtual object area at the location of the at least one caption based on information selected by a user from the information list. For example, the virtual object area adder 1440 may extract information on temporal locations and/or spatial locations of captions included in a video using the image text cognition technology, and may generate an information list that is a list of information on the captions extracted. In this case, the caption replacement service system 1400 may provide the generated information list to a user and the user may easily select a predetermined caption within the video, for example, a caption that is determined to currently have no meaning by the user by selecting information on the predetermined caption from the information list. Here, the virtual object area adder 1440 may add a virtual object area to a caption corresponding to the selected information. When information extracted using the image text cognition technology is insufficient to designate a predetermined caption, the caption replacement service system 1400 may accurately recognize a location of the caption by further referring to temporal information and/or spatial information input from the user that has been provided with the information list.

The interactive advertisement adder 1450 may add an interactive advertisement to the virtual object area. For example, the user may directly select an advertisement image and the interactive advertisement adder 1450 may add the selected advertisement image to the virtual object area. As another example, the interactive advertisement adder 1450 may add content of an advertisement pool as an interactive advertisement. For example, the interactive advertisement adder 1450 may extract, from the advertisement pool, content that is determined to draw a viewer's attention based on a propensity and a matter of interest of the viewer, and may statically or dynamically add the extracted content.

The information storage 1460 may store information on the added virtual object area. For example, the information storage 1460 may store information on a location at which the virtual object area is to be displayed, in a server in a structuralized form, for example, an XML or a JSON form or in a semantic form, such as ontology, in order to store information on the added virtual object area. Here, information on the virtual object area may include a start time and an end time for displaying the virtual object area, a size and a display location of the virtual object area, content or a URL address of an advertisement to be added to the virtual object area, an even address generated in response to a click on the virtual object area, and the like.

FIG. 15 is a block diagram illustrating an internal configuration of a caption replacement service system 1500 according to another embodiment of the present invention. The caption replacement service system 1500 of FIG. 15 may refer to a computer system configured to perform a caption replacement service method for playing an interactive advertisement, which is described with reference to FIG. 4. To this end, the caption replacement service system 1500 may include at least one storage unit 1510 (i.e., a non-transitory computer readable storage medium) configured to store at least one program and at least one computer processor 1520 configured to control execution of other constituent elements according to a control of the at least one program. Also, the caption replacement service system 1500 may include, as the other constituent elements, a video player 1530, a virtual object area searcher 1540, an interactive advertisement augmenter 1550, and an interactive service provider 1560.

The video player 1530 may play a video present on a web. For example, the video player 1530 may play a video selected on a web by a viewer viewing a VOD.

The virtual object area searcher 1540 may search for information on a virtual object area corresponding to a current video from metadata associated with the video. For example, to search for information on the virtual object area, the virtual object area searcher 1540 may search for information on the virtual object area corresponding to a video selected by the viewer at a first time when the selected video is played, or at predetermined time intervals, and may determine whether a time at which the selected video is to be played and a start time for displaying the virtual object area match.

The interactive advertisement augmenter 1550 may augment interactive advertisement information to the virtual object area using the found information on the virtual object area. For example, to augment the virtual object area, the interactive advertisement augmenter 1550 may dispose and thereby display the interactive advertisement information within the video, based on information on a temporal location and a spatial location of the virtual object area in the information found by the virtual object area searcher 1540.

The virtual service provider 1560 may provide an interactive service about an event occurring in the virtual object area by the viewer. Here, the event may occur in response to an action of the viewer such as a click or a mouse over. For example, in response to a selection of the viewer on augmented interactive advertisement information displayed at a location of a closed caption of a video being played, the virtual service provider 1560 may further provide the viewer with additional information associated with the interactive advertisement information as an interactive service.

As described above, to outperform the above-noted technical issues, embodiments of the present invention may provide a method that may prevent a misunderstanding of users viewing a VOD by effectively eliminating content of a closed caption in a VOD environment. Also, in terms of providing a service that enables a user to easily make an interactive advertisement annotation in an intuitive form, it is possible to provide a customized advertisement service by further effectively eliminating content a closed caption through an interactive advertisement annotation procedure and an interactive advertisement play procedure.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A caption replacement service method performed by a computer system, the method comprising:
    playing a video present on a web, wherein the video is not annotated and comprises a series of frames, each frame being a visual image;
    identifying automatically a portion of a visual image of a frame of the video that contains an image of text, the image of text containing content that is original to the video;
    evaluating the image of text on the portion of the visual image of the frame with image text cognition to determine a content of the textual information on the portion of the visual image of the frame;
    determining whether the content of the textual information on the portion of the visual image of the frame contains non-current information based on a current context making a meaning of the content outdated;
    searching, in response to the content of the textual information being non-current, for an augmented virtual object area corresponding to the image of text on the portion of the visual image of the frame of the video from metadata associated with the video, the augmented virtual object area comprising an overlay that hides the portion of the visual image of the frame of the video that contains the image of text and being configured to receive a dynamically selected current interactive augmentation;
    dynamically selecting an interactive augmentation based on a profile of a user;
    automatically augmenting the interactive augmentation over the non-current information on top of the virtual object area while the video is playing using the searched for information on the augmented virtual object area; and
    providing an interactive service about an event occurring in the augmented virtual object area to the user.

2. The method of claim 1, wherein the playing of the video comprises playing a video selected by a viewer on the web.

3. The method of claim 1, wherein the searching for information on the augmented virtual object area comprises:
    searching for information on the augmented virtual object area corresponding to a video selected by a viewer at: a first time when the selected video is played or a predetermined time interval; and
    determining whether a time at which the selected video is to be played and a start time for displaying the augmented virtual object area match.

4. The method of claim 1, wherein the augmenting of the interactive augmentation comprises displaying the interactive augmentation within the video based on information on a temporal location and a spatial location of the augmented virtual object area in the information on the augmented virtual object area.

5. The method of claim 1, wherein the event occurs in response to at least one of a click and a mouse over on the interactive augmentation.

6. The method of claim 1, wherein the providing of the interactive service comprises providing additional information associated with the interactive augmentation at the interactive service, in response to the occurrence of the event.

7. The method of claim 1, wherein the interactive augmentation comprises an advertisement image extracted from a predetermined advertisement pool.

8. The method of claim 7, wherein the image extracted from the advertisement pool is extracted based on a propensity and a matter of interest of a viewer.

9. The method of claim 1, wherein the information on the augmented virtual object area comprises information on at least one of a start time and an end time for displaying the augmented virtual object area, a size of the augmented virtual object area, a display location of the augmented virtual object area, content of an interactive augmentation to be added to the augmented virtual object area, a URL address of the interactive augmentation, and an event address generated in response to a click on the augmented virtual object area.

* * * * *